US007008964B2

(12) United States Patent
Clausen et al.

(10) Patent No.: US 7,008,964 B2
(45) Date of Patent: Mar. 7, 2006

(54) CONTAMINANT REMOVAL FROM NATURAL RESOURCES

(75) Inventors: Christian A. Clausen, Chuluota, FL (US); Jacqueline W. Quinn, Titusville, FL (US); Cheri L. Geiger, Geneva, FL (US); Debra Reinhart, Maitland, FL (US); Laura B. Filipek, Deltona, FL (US); Christina Coon, Oviedo, FL (US); Robert Devor, Clermont, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 306 days.

(21) Appl. No.: 10/449,907

(22) Filed: May 28, 2003

(65) Prior Publication Data

US 2004/0069720 A1    Apr. 15, 2004

Related U.S. Application Data

(60) Provisional application No. 60/441,275, filed on Jan. 17, 2003, provisional application No. 60/385,435, filed on May 29, 2002.

(51) Int. Cl.
*B01F 17/00* (2006.01)
*B01F 3/08* (2006.01)
*B09C 1/08* (2006.01)
*C02F 1/72* (2006.01)

(52) U.S. Cl. .................... 516/20; 166/305.1; 166/310; 210/198.1; 252/181; 405/128.5; 405/129.25

(58) Field of Classification Search .................. 516/20
See application file for complete search history.

(56) References Cited

U.S. PATENT DOCUMENTS

| | | | |
|---|---|---|---|
| 3,986,953 A | 10/1976 | Beaucaire | |
| 4,565,635 A | 1/1986 | Le Du | |
| 4,983,217 A * | 1/1991 | Lopez Quintela et al. | .... 75/739 |
| 5,266,213 A | 11/1993 | Gillham | |
| 5,278,106 A | 1/1994 | Nakashima | |
| 5,587,157 A | 12/1996 | Cox | |
| 5,615,974 A | 4/1997 | Land | |
| 5,641,425 A | 6/1997 | McKedy | |
| 5,746,937 A | 5/1998 | McKedy | |
| 5,759,389 A * | 6/1998 | Fernando et al. | ........ 210/198.1 |
| 5,789,649 A | 8/1998 | Batchelor | |
| 5,833,388 A | 11/1998 | Edwards | |
| 5,857,810 A | 1/1999 | Cantrell | |
| 5,975,798 A | 11/1999 | Liskowitz | |
| 5,990,365 A | 11/1999 | Chang | |
| 6,039,882 A | 3/2000 | Wolfe | |
| 6,121,371 A | 9/2000 | Matviaszewski | |
| 6,190,092 B1 | 2/2001 | Miller | |
| 6,207,114 B1 | 3/2001 | Quinn | |
| 6,217,779 B1 | 4/2001 | Orth | |
| 6,261,029 B1 | 7/2001 | Miller | |
| 6,264,399 B1 | 7/2001 | Grisso | |
| 6,265,205 B1 * | 7/2001 | Hitchens et al. | ............ 435/262 |
| 6,280,533 B1 | 8/2001 | Hoppe | |
| 6,357,968 B1 | 3/2002 | Dwyer | |
| 6,398,960 B1 | 6/2002 | Borden | |
| 6,423,531 B1 | 7/2002 | Hince | |
| 6,664,298 B1 * | 12/2003 | Reinhart et al. | ............... 516/22 |
| 2002/0061352 A1 * | 5/2002 | Ekanayake et al. | ......... 426/532 |

OTHER PUBLICATIONS

Summary of the Remediation Technologies Development Forum Permeable Reactive Barriers Action Team Meeting, Jun. 12, 2001, http://www.rtdf.org/public/permbarr/minutes/061201.htm printed Ma 23, 2005.*
Geiger et al., "The In Situ Treatment of DNAPL with Zero-Valent Iron Emulsion," Google.com, 27 pages.
"Permeable Reactive Barrier Update", Environmental Technologies, Inc., May 2000, 4 pages, www.eti.ca.
"Zero Valent Iron", Center for Groundwater Research, 4 pages, http://cgr.ese.ogi.edu/iron/iron.
Lee and Borden, "Technololgy Application of Low Cost Emplacement of Insoluble Organic Substrate for Enhanced In Situ Reductive Dechlorination of Halogenated Aliphatic Hydrocarbons," AFCEE, Dover Air Froce Base, Delaware, 6 pages, (Oct. 28, 1999).
"Emulsified Zero-Valent Iron (EZVI)" Technical Opportunity Sheet, NASA. Released Aug. 2002.

* cited by examiner

*Primary Examiner*—Randy Gulakowski
*Assistant Examiner*—Timothy J. Kugel
(74) *Attorney, Agent, or Firm*—Randall M. Heald

(57) ABSTRACT

A zero-valent metal emulsion containing zero-valent metal particles is used to remediate contaminated natural resources, such as groundwater and soil. In a preferred embodiment, the zero-valent metal emulsion removes heavy metals, such as lead (Pb), from contaminated natural resources. In another preferred embodiment, the zero-valent metal emulsion is a bimetallic emulsion containing zero-valent metal particles doped with a catalytic metal to remediate halogenated aromatic compounds, such as polychlorinated biphenyls (PCBs), from natural resources.

38 Claims, No Drawings

CONTAMINANT REMOVAL FROM NATURAL RESOURCES

CROSS-REFERENCE TO RELATED APPLICATIONS

This application claims the benefit, under 35 U.S.C. 119(e), of U.S. Provisional Application No. 60/441,275 filed Jan. 17, 2003 and U.S. Provisional Application No. 60/385,435 filed on May 29, 2002, the contents of which are incorporated herein by reference.

ORIGIN OF INVENTION

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title.

BACKGROUND OF THE INVENTION

1. Field of the Invention

The present invention related generally to the use of a zero-valent metal emulsion to remediate contaminants found in a natural resource, such as groundwater, surface water, soils and sediment.

2. Description of Related Art

The removal of contaminants from natural resources is an ongoing and significant problem. Numerous tactics have been considered with various degrees of success.

Remediation of soils and groundwater contaminated with chlorinated hydrocarbons is important because of the potential carcinogenic nature of the parent compounds and the products of degradation, and their resistance to natural attenuation in the environment. For example, conventional wastewater treatment processes are unable to bring down the trichloroethylene (TCE) levels to drinking water standards (5 ppb). Various ex situ processes like activated carbon adsorption and air stripping are effective in achieving drinking water standards. But, with these methods, the contaminant still must be removed from the solid or vapor medium. The use of advanced oxidation processes such as $UV/O_3/H_2O_2$ has been reported. However, these processes are likewise limited to ex situ treatment.

The remediation of polychlorinated biphenyls (PCBs) and other chlorinated synthetic aromatic compounds are of great concern due to their toxicity and persistence in the environment. PCBs entered the groundwater, surface water, sediment and soil environments through improper disposal and leaks from heat exchangers, transformers, and hydraulic systems. PCBs were used in many industrial applications because of their robust physical and chemical properties such as their resistance to acids, bases and oxidation, their excellent dielectric characteristics and their thermal stability at high temperatures (up to 350° C.). When released into the environment, PCBs are sorbed to particulate matter that can then disperse over large areas. PCBs can be introduced into the food chain by the uptake of contaminated sediments by biota at the water sediment interface. Although the U.S. Environmental Protection Agency (EPA) has banned the manufacture of PCBs since 1979, they are still present in the environment posing possible adverse health affects to both humans and animals. Thus, it is of utmost importance to develop a method that remediates PCBs contaminated soils and waters.

There are presently no widely accepted methods for the remediation of soils or water that are contaminated with PCBs. Several methods have been proposed and tested, both ex-situ and in-situ including the use of microorganisms for the aerobic and anaerobic biodegradation of PCBs in soils, the incineration of PCB laden soils, and other chemical methods like solvent extraction. However, all these methods require long times and/or very elevated temperatures for the dehalogenation to occur and are not practical and usually end up being very expensive.

Another growing environmental concern in the world today is that of contamination of soils and sediments by heavy metal ions such as lead and arsenic. This type of contamination is caused primarily by smelting and mining activities. Heavy metals leave contaminated areas unusable for agricultural and residential purposes. Additionally, heavy metals may pollute drinking water and cause health problems to individuals when the heavy metals leach into the groundwater system. Therefore, strict governmental regulations have been enacted which require businesses associated with contaminated sites to remove the heavy metals from the ground. Although the polluting source may be controlled or eliminated, methods which would provide a safe means of removing the heavy metals entirely from the ground are of great importance. Additionally, any method used to remove the heavy metals from the ground should be environmentally safe. A method that would remove the heavy metals without producing additional hazardous waste would be most advantageous. Current techniques used for remediation of these contaminants are primarily ex situ, which increases the cost and difficulty of such clean up operations. An in situ technique would be much simpler to implement and more cost effective than the techniques in use today.

Several researchers have demonstrated that zero-valent iron is very effective in the treatment of many chlorinated hydrocarbons, such as dissolved trichloroethylene (TCE). Nanometer size iron particles have also been incorporated into a slurry and then injected into a soil matrix to form a permeable reactive barrier (PBR) to intercept a contaminated groundwater plume. All known PRB technologies have been used to treat contaminated groundwater plumes by intercepting them while leaving the source of the contamination untreated. The quality of dense non-aqueous phase liquid (DNAPL) in the source may be at such levels that they could feed and contaminate a plume for hundreds of years, thus requiring that the PRB be active for that many years. Additionally, the DNAPL frontal boundary is hydrophobic and will reject a hydrophilic iron particle slurry, thus preventing the dehalogenation from occurring.

Previous research proved the feasibility of using an emulsified system to dehalogenate a DNAPL source, such as TCE, in the subsurface by means of an in-situ injection. To accomplish this, a dense reactive emulsion was generated that when injected into the ground, would enter the DNAPL pool, encapsulate it and degrade the chlorinated solvents into benign by-products. This emulsified system consisted of a surfactant stabilized oil-in-water emulsion with reactive iron contained within the emulsion micro-droplets. The surfactant served two purposes: it made the emulsion stable for injection into the DNAPL and it aided in the delivery of TCE to the iron. The generation of a hydrophobic emulsion system drew the DNAPL TCE through the oil membrane where it diffused to the iron particle and underwent degradation. TCE continued to enter, diffuse, degrade and exit the micro-droplet maintaining a concentration gradient across the membrane, thus maintaining the driving force of the reaction. This iron-emulsion system can be delivered in-situ to a DNAPL pool through a series of push wells. Research was done to prove that it was possible to introduce an emulsified system by way of slurry injection into a soil matrix. However, zero-valent iron alone is unable to completely dechlorinate PCBs dissolved in aqueous solutions.

Prior research has indicated that emulsified zero-valent iron is a useful technique for the in situ remediation of DNAPLs such as trichloroethylene. An emulsion that is adapted for the in situ removal of heavy metal ions would be desirable. This emulsion would be environmental friendly and cost effective.

BRIEF SUMMARY OF THE INVENTION

The present invention comprises a zero-valent metal emulsion containing zero-valent metal particles for remediating contaminated natural resources. In a preferred embodiment, the zero-valent metal emulsion removes metals, such as heavy metals, from contaminated natural resources. In another preferred embodiment, the zero-valent metal particles are doped with a catalytic metal to form a bimetallic emulsion to remediate chlorinated aromatic compounds, such as polychlorinated biphenyls (PCBs), from natural resources.

In a preferred embodiment, the zero-valent metal particles are microscale or nanoscale zero-valent iron particles. Microscale and nanoscale zero-valent iron particles are excellent reactive media to incorporate into a preferred zero-valent iron emulsion due to their reactivity, low cost, and natural presence in the subsurface. However, other zero-valent metal particles and combinations may be used to remediate the natural resource.

Food grade vegetable oils and various cationic, anionic and nonionic surfactants are preferred components in the generation of the zero-valent metal emulsion. Preferably, food-grade surfactants are used because of their low toxicity.

In a first embodiment of the present invention, a zero-valent metal emulsion is used to remove metals, preferably heavy metals, for example lead (Pb) or arsenic (As) from a natural resource such as soil, surface water, groundwater and sediments in situ or ex situ. The zero-valent metal emulsion is preferably formed by incorporating microscale or nanoscale zero-valent metal particles or bimetallic particles, wherein the preferred metal is iron or palladium doped iron, into a surfactant-stabilized, biodegradable oil-in-water emulsion. The zero-valent metal emulsion is used to remove metals that have sorbed onto a soil matrix. The metals desorb from the soil, enter into a micro-droplet within the zero-valent metal emulsion and coat or plate onto a surface of the microscale or nanoscale zero-valent metal particle or are held within the micro-droplet. The zero-valent metal emulsion, which now contains the heavy metal that has been removed from the soil, can then be removed from the subsurface, surface water, soil or sediments utilizing a magnetic field on the microscale or nanoscale zero-valent metal particle or other removal method such as oil/water separators or excavation.

In a second embodiment of the present invention, a bimetallic emulsion is used to completely degrade polychlorinated biphenyls (PCBs), chlorinated pesticides and other halogenated aromatic compounds in situ. The bimetallic emulsion is a zero-valent metal emulsion having nanoscale or microscale bimetallic particles incorporated into a surfactant-stabilized, biodegradable oil-in-water or d-limonene-in-water emulsion. For example, bimetallic particles are formed by surface coating a zero-valent iron particle with a catalytic metal, preferably palladium (Pd). The bimetallic particles are contained within an aqueous zone of a micro-droplet within the bimetallic emulsion while the outer skin of the micro-droplet is hydrophobic. When the micro-droplet comes into contact with the PCB molecule, the PCB molecule passes through a wall of the micro-droplet and then is adsorbed onto the bimetallic particle where it is dechlorinated and reduced to biphenyl and chloride ions. The elemental iron serves as the reducing agent and is oxidized to ferrous and ferric ions. The palladium on the surface of the zero-valent iron particle serves as a catalyst for the dechlorination reaction. Preferably, the bimetallic emulsion is directly injected into the contaminated zone, to provide in situ degradation of PCBs and other halogenated compounds. The emulsion may be left in place or extracted using a magnetic field applied to the microscale or nanoscale zero-valent metal particle or other removal method such as oil/water separators or excavation. In some situations, it may be acceptable to leave the emulsion in place.

The present invention overcomes the previous understanding that the incorporation of zero-valent metal particles, such as iron particles, into a liquid membrane micro-droplet would lead to passivation of the particle surface with regard to its ability to dehalogenate compounds. Kinetic studies have shown that the dehalogenation rates of a zero-valent metal emulsions are very high, and in fact, are much higher than free zero-valent metal particles in certain situations.

A beneficial feature of the zero-valent metal emulsion is that no halogen-containing molecules or metals exit from the micro-droplet during remediation. The zero-valent metal emulsion draws PCB or other aromatic halogenated compounds into the inside of the micro-droplet where the degradation reaction takes place. For example, during the remediation of PCB, no chlorinated daughter-products have been found to exit from the micro-droplet. The only degradation by-products that have been detected are hydrocarbons, such as biphenyl, which are easily degraded by biological action and are non-toxic.

Additionally, the zero-valent metal emulsion is simple to prepare and is relatively inexpensive. The zero-valent emulsion is made from environmentally compatible components. The preferred surfactant is of the food-grade quality, and the liquid membrane preferably consists of a vegetable oil which is biodegradable, or d-limonene or a combination of the two. Since the zero-valent metal emulsion can be injected using simple push wells and incur no continuing operating costs, use of a zero-valent emulsion possesses an economic advantage over other metal/PCB treatment technologies. Because of the thousands of contaminated sites in the United States alone, use of this technique would generate millions of dollars in economic improvement within the remediation community.

DETAILED DESCRIPTION OF THE INVENTION

The present invention comprises a zero-valent metal emulsion containing zero-valent metal particles for remediating contaminated natural resources. In a preferred embodiment, the zero-valent metal or bimetal emulsion removes metals from contaminated natural resources. In another preferred embodiment, the zero-valent metal emulsion is a bimetallic emulsion containing zero-valent metal particles doped with a catalytic metal used to remediate polychlorinated biphenyls (PCBs) from natural resources.

In a first preferred embodiment, a zero-valent iron emulsion containing microscale or nanoscale zero-valent iron particles is used to remove metals, preferably heavy metals, for example lead, arsenic, cadmium, selenium or any metal that is lower than iron on the electromotive series, in a natural resource. Zero-valent metal emulsions are used to remove metals that have been sorbed onto a soil matrix. The metals desorb from the soil, enter into a micro-droplet within the zero-valent metal emulsion and coat or plate onto a surface of the zero-valent metal particle or are held within the micro-droplet. The zero-valent metal emulsion, which now contains the metal that has been removed from the soil, can then be removed from the subsurface utilizing a magnetic field on the zero-valent metal particle or other physical removal technique such as an oil/water separator. The zero-valent metal emulsion contains a surfactant stabilized biodegradable oil-in-water emulsion and/or d-limonene in water emulsion with zero-valent metal particles contained within emulsion micro-droplets. In the preferred zero-valent iron emulsion, a very active zero-valent iron emulsion contains 15–60 wt. % oil, 15–60 wt % water, 6–20 wt. % zero-valent iron particles, 1.0–3.0 wt. % surfactant. More preferably, the zero-valent iron emulsion contains 42.7 wt. % oil, 47.4 wt. % water, 8.5 wt % zero-valent iron particles, 1.4 wt. % surfactant. However, other ranges of oil, water, zero-valent iron particles, and surfactant may also be effective to remove the metal from the natural resource.

In a second preferred embodiment, a bimetallic emulsion is used to remediate halogenated aromatic compounds, such as PCBs and chlorinated pesticides, from natural resources, such as groundwater, surface waters, sediments and soil. The bimetallic emulsion is a zero-valent metal emulsion having bimetallic particles incorporated into a surfactant-stabilized, biodegradable oil-in-water emulsion or d-limonene-in-water emulsion, or a mixture of both. The bimetallic particles are zero-valent metal particles doped with a catalytic metal. In a preferred embodiment, the bimetallic particles are zero-valent iron particles doped with palladium. Other catalytic metals include platinum, gold, or rhodium. The bimetallic particles are contained within an aqueous zone of a micro-droplet within the bimetallic emulsion while the outer skin of the micro-droplet is hydrophobic. When the micro-droplet comes into contact with a PCB molecule, the PCB molecule passes through a wall of the micro-droplet and then is adsorbed onto the bimetallic particle where it is dechlorinated and reduced to biphenyl and chloride ions. The elemental iron serves as the reducing agent and is oxidized to ferrous and ferric ions. The catalytic metal on the surface of the zero-valent iron particle serves as a catalyst for the dechlorination reaction. In the preferred bimetallic emulsion, a very active bimetallic emulsion contains 15–60 wt. % oil and/or d-limonene, 15–60 wt. % water, 6–20 wt. % bimetallic particles, 1–3 wt. % surfactant. The bimetallic particles are preferably doped with 0.01–3.0 wt. % catalytic metal. However, other ranges of oil, d-limonene, water, bimetallic particles, surfactant, and catalytic metal may also be effective to remove halogenated aromatic compounds from the natural resource.

In a preferred embodiment, the zero-valent metal particles are microscale or nanoscale zero-valent iron particles. Microscale and nanoscale zero-valent iron particles are excellent reactive media to incorporate into a preferred zero-valent iron emulsion due to their reactivity, low cost, and natural presence in the subsurface. Preferably, the microscale zero-valent iron particles have a diameter in the range of 1–3 microns. Whereas, the preferred nano scale zero-valent iron particles have a diameter in the range of 20–300 nm. It should be understood that other zero-valent metal particles and combinations may be used to remediate the natural resource.

Food grade vegetable oils and various cationic, anionic and nonionic surfactants are preferred components in the generation of the zero-valent metal emulsion. Preferred food grade vegetable oils include corn oil, saflower oil, peanut oil, cottonseed oil, olive oil, and soybean oil. Preferably, food-grade surfactants used in the zero-valent metal emulsion are used because of their low toxicity. Table 1 contains a list of preferred surfactants.

TABLE 1

| Trade Name | Chemical Name | CAS # |
| --- | --- | --- |
| AEROSOL OT (10% and 75%) Foodgrade | Sodium sulfoccinate | 577-11-7 |
| ARLECEL 83 | Sorbitan sesquioleate | 8007-43-0 |
| ALKAMULS PSMO-20 Foodgrade | Sorbitan monooleate (Ethoxylated) | 9005-65-6 |
| LONZEST STO | Sorbitan Trioleate | 26266-58-0 |
| RHODACAL DS-4 | Sodium Dodecylbenzene Sulfonate | 25155-30-0 |
| RHODACAL N | Sodium Napthalene Sulfonate (Formaldehyde Polymer) | 9084-06-4 |
| RHODAPAN LSB Foodgrade | Sodium Lauryl Salfate | 151-21-3 |
| SPAN 60 Foodgrade | Sorbitan Monostearate | 1338-41-6 |
| SPAN 80 Foodgrade | Sorbitan Monooleate | 1338-43-8 |
| SPAN 85 Foodgrade | Sorbitan Trioleate | 26226-58-0 |
| TWEEN 61 | Polyoxyethylene-sorbitan Monostrearate | 9005-67-8 |
| TWEEN 65 | Polyoxyethylene-sorbitan Tristeanate | 9005-71-4 |
| TWEEN 80 | Polyoxyethylene-sorbitan Monooleate | 9005-65-6 |
| TWEEN 81 | Polyoxyethylene-sorbitan Monooleate | 9005-65-6 |
| TWEEN 85 | Polyoxyethylene-sorbitan Trioleate | 9005-70-3 |

A bisurfactant emulsion may be formed by incorporating a water soluble surfactant and an oil soluble surfactant within the zero-valent metal emulsion. A preferred water soluble surfactant would increase the transport of the contaminant, such as PCB, to the micro-droplet while maintaining the oil membrane. By way of example, a preferred water soluble surfactant would be alkylaryl polyether alcohol and a preferred oil soluble surfactant would be sorbitan trioleate. Most preferably, the water soluble surfactant is selected from a group comprising oleyl cetyl alcohol, isotridecyl alcohol, and alkylaryl polyether alcohol. Whereas, the preferred oil soluble surfactant is selected from a group comprising sorbitan trioleate, bis-2-ethylhexyl sodium sulfosiuccinates, sodium salt of sulfonated naphthalene-formaldehyde condensate, and sodium dodecyl monolaureate. The amount of water-soluble surfactant and oil-soluble surfactant should be controlled such that the transport of the contaminant into the micro-droplet is increased without deteriorating the oil membrane.

The zero-valent metal emulsion may also contain water conditioned to have a pH that is either neutral, acidic or basic. By adjusting the pH of the water, the amount of contaminant removed from the natural resource will increase. An acidic emulsion is preferably prepared by adding a diluted acid to the water used to prepare the zero-valent metal emulsion. Preferably, the acidic emulsion would have a pH between 4 and 5. Preferred diluted acids include hydrochloric, sulfuric, nitric, acetic acid, lactic acid and any other mineral, organic or carboxilic acid. A basic emulsion is preferably prepared by adding a diluted base to the water used to prepare the zero-valent metal emulsion. Preferably, the basic emulsion would have a pH between 9 and 10. Preferred diluted bases include sodium hydroxide, organic amines, or any mineral or organic base.

Additionally, the zero-valent metal emulsion may contain a stabilizing additive incorporated in the zero-valent metal emulsion to add stability to the micro-droplets. Preferred stabilizing additives, such as paraffin, would keep the oil, d-limonene and/or surfactants in the zero-valent metal emulsion from volatilizing. A preferred additive would not inhibit transport of the contaminant through the zero-valent metal emulsion. In a preferred zero-valent metal emulsion, paraffin is present in an amount of about 1.3 wt %.

The zero-valent metal emulsion may be delivered to the natural resource in a variety of ways. Ideally, the natural resource would be located and defined. In one embodiment, the zero-valent metal emulsion is delivered in-situ to contaminated media via a system of injection wells. The injection wells may be permanent structures that are left in the ground for repeatedly injecting the zero-valent metal emulsion into the media. The injection wells may contain screen portions through which the zero-valent metal emulsion may pass in order to contact the natural resource. Alternatively, the zero-valent metal emulsion may be delivered to the natural resource using direct push technology. This technology includes push rods that are forced into the injection site. A distal portion of the push rods has a series of holes along its length for delivering the zero-valent emulsion. The push rods are advanced further into the contaminated region depending on the amount and depth of the contamination. When the injection of the zero-valent metal emulsion is complete, the push rods are removed from the ground. It is also possible to deliver the zero-valent metal emulsion by way of slurry injection into a soil matrix. This process decreases the need for long-term treatment and monitoring of the contaminated areas. The zero-valent emulsion may be injected into sediment in a similar manner as it is injected into soil. A bubble diffuser technique may also be used to bubble the zero-valent metal emulsion into sediment over a small area. Using this technique, the zero-valent metal emulsion would sit for a defined reaction time and then the zero-valent metal particles would be extracted with a magnet.

EXAMPLES

Heavy Metal Removal Experiments

A vial study was set up to show that a zero-valent iron emulsion could be used to remove lead (Pb) ions from a solution. Six vials were set using a freshly prepared zero-valent iron emulsion. The zero-valent iron emulsion included 80 mL generic vegetable oil –100 mL $H_2O$–20 grams iron–3 grams Span 85. Nanoscale zero-valent iron particles (80–100 nm in diameter) were used. Each of the sample vials contained ~2 grams of this 80-100-20-3 zero-valent iron emulsion, as well as 15 mL of a 10 ppm Pb standard. The Pb standard was prepared from a 1000 ppm lead reference solution obtained from Aldrich, Inc. for use with atomic absorption (AA) spectroscopy and elemental analysis. Two control vials containing only 15.0 mL of the 10 ppm Pb standard were also prepared. Table 2 indicates the results obtained from AA analysis:

TABLE 2

|  | Concentration (ppm) | % Of Pb Removed |
|---|---|---|
| Control 1 | 11.1 | N/A |
| Sample 1a | 0.1 | 99.1 |
| Sample 1b | 0.1 | 99.1 |
| Sample 2a | 0.1 | 99.1 |
| Sample 2b | 0.1 | 99.1 |

Virtually all of the Pb ions were removed from the solution using the nanoscale zero-valent iron emulsion.

A second study was set up to show that the zero-valent iron emulsion could remove Pb that was found in soils or sediments. A soil vial study was set up to show the feasibility of this concept. A soil that was spiked with an appropriate amount of lead was prepared in order to begin this vial study. A quantity of soil was dried and filtered (to remove rocks, shells, sticks, etc.). The incipient wetness of this soil was determined to be ~188 mL for 500 grams of soil. A soil concentration of 100 ppm Pb was desired for this study, which was prepared using the 1000 ppm Pb reference solution from Aldrich. Exactly 499.97 g of the dried and filtered soil was obtained. Approximately 50 mL of water was added to this, followed by 50.0 mL of the 1000 ppm Pb reference solution. Then, ~85 mL of water was added to reach incipient wetness and the soil was allowed to dry overnight. Three different zero-valent iron emulsions were freshly prepared for this study, each with the formulation of 80-100-20-3, but with varying water pH. An acidic (pH 4–5), basic (pH 9–10), and a neutral (pH 7) zero-valent iron emulsion were prepared by adding a few drops of either diluted acid/base to the 100 mL of water used in the preparation of the zero-valent iron emulsion. This was done in order to see if there was a relationship to the effectiveness of the zero-valent iron emulsion and the pH of the water used in its preparation. Approximately 20.00 grams of the spiked soil were placed in each of the sample vials, which were then brought to incipient wetness with approximately 6.5 mL of water. Then, 3 mL of the freshly prepared zero-valent iron emulsions were added to the vials (6 vials per emulsion pH). Finally, 5 mL of standing water were added to each vial. In addition to the sample vials, three control vials were set up that contained only the ~20 grams of spiked soil, the water needed to reach incipient wetness, and the standing 5 mL of water. All of the samples were placed on a sample shaker. Two sample vials from each zero-valent iron emulsion type and a control vial were run for each analyses. After the vials had been allowed to shake for 2–3 weeks, the samples were analyzed for lead content of the soil. Before actually filtering the soil, the sample was transferred to a plastic bag. The bag was placed next to a powerful magnet and a small puncture hole was made in the bag to allow the soil and water to exit into a beaker. The zero-valent iron emulsion contains iron, so the magnet continues to hold the zero-valent iron emulsion in the plastic bag. This was repeated until there was no zero-valent iron emulsion left in the sample. The zero-valent iron emulsion waste was properly discarded, and the soil and water was transferred to a Buchner funnel and rinsed with DI water. This soil was then dried and then was subjected to a modified EPA Method 3050b nitric acid extraction. The results of the AA analysis are shown in Table 3:

TABLE 3

|  | % of Pb Removed | Remaining mg Pb/kg soil |
| --- | --- | --- |
| Control 2 | N/A | 144 |
| Control 2 dup | N/A | N/A |
| Neutral 2a | 45.8 | 78 |
| Neutral 2a dup | 54.2 | 66 |
| Neutral 2b | 50.0 | 72 |
| Neutral 2b dup | 54.2 | 66 |
| Acidic 2a | 66.7 | 48 |
| Acidic 2a dup | N/A | N/A |
| Acidic 2b | 54.2 | 66 |
| Acidic 2b dup | 58.3 | 60 |
| Basic 2a | 70.8 | 42 |
| Basic 2a dup | 70.8 | 42 |
| Basic 2b | 70.8 | 42 |
| Basic 2b dup | 66.7 | 48 |

There is a definite increase in the amount of lead removed by the zero-valent iron emulsion, especially in the acidic and the basic emulsions. The range of removal was from 46% to 71%. The analysis of the percent of lead removed was based upon Control 2.

Another question that needed to be answered is whether or not the lead ions are actually plating out on the microscale iron particles in the zero-valent iron emulsion or simply being trapped in the oil layer. The latter possibility would definitely be a problem, since it would simply solubilize and mobilize the lead, allowing it to move to an uncontaminated site. It was decided to actually analyze the microscale iron particles from the zero-valent iron emulsion in an attempt to answer this question. To do this, a new vial study was set up.

From the concentration of Pb used in the spiked samples, ideally, 5 g of the 80-100-20-3 zero-valent iron emulsion should contain ~0.5 g of iron. It was determined that a maximum of 0.2 mg of lead could have plated onto the iron. Assuming that the lead dispersed equally onto the 0.5 g of microscale iron particles, it can be determined what the maximum amount of lead that could be on the amount of microscale iron particles collected. For example, 0.25 g of microscale iron particles was recovered from sample 3b. Since this is ~50% of the total microscale iron particles from the zero-valent iron emulsion, theoretically 50% of the total lead should be recoverable (assuming it is all plating out on the microscale iron particles). That would mean there should be at most 0.1 mg of lead in that sample. Since it was diluted to a final volume of 100.0 mL, which means the highest concentration obtainable would be 1.0 ppm. A study was setup with twelve samples containing 5 g of freshly prepared 80-100-20-3 zero-valent iron emulsion and 20 mL of 10 ppm lead standard solution. Six control vials were set up that contained 5 g of the 80-100-20-3 zero-valent iron emulsion and 20 mL of DI water. It was decided that half of the vials would be run after two days, then the rest of vials would be run after approximately one week. This was done to see if an increase in time would lead to increase in the amount of plated lead. Table 4 shows the results of this series of experiments including percent Pb plated out on the microscale iron particles.

TABLE 4

|  | % Fe Rec. | Max Pb (mg) | Final Vol (mL) | Max Pb (ppm) | % Pb Plated |
| --- | --- | --- | --- | --- | --- |
| Control 1a | 79.10 | N/A | 75.0 | N/A | N/A |
| Control 1b | 80.15 | N/A | 75.0 | N/A | N/A |
| Control 2a | 81.19 | N/A | 110.0 | N/A | N/A |
| Control 2b | 70.78 | N/A | 100.0 | N/A | N/A |
| Sample 1a | 81.28 | 0.16 | 75.0 | 2.17 | 27.68 |
| Sample 1b | 88.06 | 0.18 | 75.0 | 2.35 | 42.58 |
| Sample 2a | 69.68 | 0.14 | 90.0 | 1.55 | 51.67 |
| Sample 2b | 83.68 | 0.17 | 77.0 | 2.17 | 50.61 |
| Sample 3a | 52.71 | 0.11 | 75.0 | 1.41 | 56.92 |
| Sample 3b | 60.90 | 0.12 | 75.0 | 1.62 | 43.10 |
| Sample 4a | 60.41 | 0.12 | 75.0 | 1.61 | 49.66 |
| Sample 4b | 52.14 | 0.10 | 75.0 | 1.39 | 57.54 |
| Sample 5a | 55.46 | 0.11 | 75.0 | 1.48 | 60.86 |
| Sample 5b | 74.61 | 0.15 | 76.0 | 1.96 | 66.21 |
| Sample 6a | 51.63 | 0.10 | 76.0 | 1.36 | 66.24 |
| Sample 6b | 67.56 | 0.14 | 75.0 | 1.80 | 66.61 |

The percent of microscale iron particles recovered was obtained by dividing the amount of microscale iron particles retained by the filter by the total possible amount of microscale iron particles from the zero-valent iron emulsion, which was 0.5092 g and multiplying the result by 100. The maximum amount of Pb (mg) was obtained by multiplying the percent % of microscale iron particles recovered by 0.2 mg, which is the total amount of lead found in 20 mL of 10 ppm lead solution. The maximum amount of Pb (ppm) in the filtrate was calculated by dividing the total possible Pb (mg) by the final volume (after converting it to liters). Finally, the percent of Pb that plated out on the microscale iron particles was determined by dividing the actual concentrations obtained using GFAA by the maximum amount Pb (ppm) possible and multiplying the result by 100. It can be seen that most of the samples have plated out between ~40%–70% of the lead. It also appears that the samples run after 1 week seem to have plated out more of the lead, leading to the possible conclusion that it takes a certain amount of time for the lead ions to traverse the oil layer.

Polychlorinated Biphenyl (PCB) Removal Experiments

Preparation of Bimetallic Nanoscale and Microscale Particles

Before conducting the experiments involving the removal of PCBs from natural sources, the zero-valent metal particles must be coated with a catalytic metal. In a first preferred embodiment, microscale zero-valent iron is coated with palladium (Pd) using a solution of $K_2PdCl_6$ as follows. Approximately 100 g of microscale zero-valent iron particles, such as provided by Alfa Aesar, Inc. or BASF, Inc., is weighed and placed in a Büchner Funnel. The microscale zero-valent iron particles are then washed with 100 ml of a 5% hydrochloric (HCl) or sulfuric ($H_2SO_4$) solution (5 mL HCL or $H_2SO_4$ and 95 mL of Deoxygenated DI water). The microscale zero-valent iron particles are then filtered. Then 0.19 g of $K_2PdCl_6$ was weighed out and dissolved in 100 mL of deoxygenated DI water. All of the filtered microscale zero-valent iron particles were placed in an Erlenmeyer flask and the $K_2PdCl_6$ solution was added. The resulting mixture was stirred in the flask using a magnetic stirrer for 5 minutes. The solution was then allowed to settle and filtered until dry. The resulting bimetallic microscale particles had a palladium coating of approximately 0.06% Pd/Fe. In a second preferred embodiment, microscale zero-valent iron is coated with palladium (Pd) using a 40 g/L Pallamerse solution. The Pallamerse solution is made up of 10.0% potassium dinitrosulfate palladate (II), $K_2(Pd(NO_2)_2SO_4$. The following procedure indicates a preferred method for coating 2.5 g of microscale zero-valent iron particles. The microscale zero-valent iron particles are washed in a Büchner Funnel with 10 mL of 10% $H_2SO_4$ solution. The microscale zero-valent iron particles are then rinsed with 10 mL of deoxygenated DI water. Then, 5 mL of the Pallamerse solution is then added and the mixture is allowed to sit for 2 minutes before filtering. After the mixture is filtered, the microscale zero-valent iron particles are washed with 10 mL of deoxygenated DI water. The material is then filtered until dry. The resulting bimetallic microscale particles had a palladium coating of approximately 7% Pd/Fe.

Vial studies

Vial studies were designed to measure the effectiveness of several nanoscale and microscale zero-valent Pd/Fe emulsions. Monitoring the rate of PCB degradation can become quite complex, due to the number of congeners that are present in any one PCB mixture. In order to quantitate PCB degradation, the production of biphenyl, the terminal product of the dehalogenation reaction, is monitored. The rate of biphenyl production is measured after solvent extraction and acid clean up of the samples. Crimp top, gas-tight 20 ml vials were used for this study. All samples were prepared in an inert atmosphere (nitrogen purged) glovebox. Each sample vial consisted of a measured amount of zero-valent Pd/Fe emulsion or neat Pd/Fe particles and 10 ml of PCB solution. Deoxygenated deionized water was used to make up the PCB solution. After each component had been added, the vials were sealed, and then stored on a shaker table until they were ready for analysis.

Samples were analyzed on a Hewlett Packard 5890 series II Plus gas chromatograph (GC) that was equipped with a flame ionization detector (FID). A SPB™-5 column with a length of 30.0 m and an internal diameter of 0.32 mm was installed on the GC. The oven temperature was programmed as follows: initial temperature of 100° C. for 4.0 minutes, initial temperature was ramped at 15° C. per minute to a final temperature of 280° C., final temperature was held for 14.0 minutes. The carrier gas was helium set at a flow of 1.26 ml/min. The samples were introduced to the GC via manual injection.

Instrument blanks were run along with the extracted samples to ensure the instrument was free of contamination. The biphenyl concentration in the sample was calculated using data generated from calibration curves.

Since the terminal product of the dehalogenation of all PCBs is biphenyl, the rate of PCB degradation can be determined by monitoring the rate of biphenyl production. The appearance of biphenyl proves the PCBs have entered into the emulsion micro-droplet where the dehalogenation reactions take place. By comparing the rates of biphenyl production in zero-valent metal emulsions made with nanoscale and microscale doped zero-valent iron particles, it can be determined which configuration would yield a more reactive bimetallic emulsion.

Several zero-valent Pd/Fe emulsions were tested for their reactivity by extracting the aqueous sample with a solvent followed by acid clean up. The zero-valent Pd/Fe emulsions that were tested were all stable and flowable and were able to dehalogenate the PCBs to their final product biphenyl. The kinetic studies indicate that the PCBs enter the zero-valent Pd/Fe emulsion micro-droplet and degradation occurs. Any lesser-chlorinated PCB congeners produced during the dehalogenation process remain in the zero-valent Pd/Fe emulsion and are eventually converted to biphenyl. Table 5 shows the concentration of biphenyl (mg/L) produced by neat Pd/Fe particles or zero-valent Pd/Fe emulsion.

TABLE 5

| Experimental Condition | Initial Concentration PCB (mg/L) | Concentration Biphenyl (mg/L) | Percent Conversion | Number pf Days for Experiment |
|---|---|---|---|---|
| Pd/Fe Neat | 20 | 6.3 | 78 | 8 |
| Pd/Fe Neat | 20* | 6.2 | 57 | 13 |
| Pd/Fe Neat | 20 | 7.3 | 91 | 8 |
| Pd/Fe Emulsion | 5.0 | 1.8 | 90 | 14 |
| Pd/Fe Emulsion | 10 | 3.6 | 90 | 14 |
| Pd/Fe Emulsion | 20 | 7.1 | 89 | 14 |

*Using Aroclor 1254 instead of Aroclor 1260

The data shows that the PCBs are completely dehalogenated to the final product biphenyl. An Aroclor 1260 PCB congener mixture contains 60% chlorine by weight and complete dehalogenation of a 20 mg/L Aroclor 1260 PCB solution would result in a 8 mg/L biphenyl production after complete dehalogenation by the neat Pd/Fe particles or the zero-valent Pd/Fe emulsion.

Kinetic studies have shown microscale and nanoscale zero-valent iron emulsions doped with a catalytic material to be effective in challenging and dehalogenating sorbed and aqueous-phase PCBs. Any lesser-chlorinated PCBs generated in the reaction remained encapsulated in the emulsion micro-droplet and led to the production of biphenyl. The rates of biphenyl production for various zero-valent Pd/Fe emulsions and neat Pd/Fe particles were compared and the zero-valent Pd/Fe emulsions seemed to be a possible solution to the removal of PCB contamination in soils and groundwater.

Although the present invention has been disclosed in terms of a preferred embodiment, it will be understood that numerous additional modifications and variations could be made thereto without departing from the scope of the invention as defined by the following claims:

What is claimed is:

1. A zero-valent metal emulsion comprising,
   a) a plurality of bimetallic particles, wherein said plurality of bimetallic particles is a plurality of zero-valent metal particles coated with a catalytic metal;
   b) a surfactant;
   c) an oil or d-limonene or both oil and d-limonene; and
   d) water.

2. The zero-valent metal emulsion of claim 1, wherein said plurality of zero-valent metal particles is a plurality of zero-valent iron particles.

3. The zero-valent metal emulsion of claim 2, wherein said plurality of zero-valent iron particles is a plurality of nanoscale zero-valent iron particles or a plurality of microscale zero-valent iron particles.

4. The zero-valent metal emulsion of claim 3, wherein said plurality of nanoscale zero-valent iron particles are 100–300 nm in diameter.

5. The zero-valent metal emulsion of claim 3, wherein said plurality of microscale zero-valent iron particles are 1–3 microns in diameter.

6. The zero-valent metal emulsion of claim 2, comprising
 a) 6–20 wt. % zero-valent iron particles coated with a catalytic metal;
 b) 1.0–3.0 wt. % surfactant;
 c) 15–60 wt. % oil or d-limonene; and
 d) 15–60 wt. % water.

7. The zero-valent metal emulsion of claim 6, comprising
 a) 8.5 wt. % zero-valent iron particles coated with a catalytic metal;
 b) 1.4 wt. % surfactant;
 c) 42.7 wt. % oil or d-limonene; and
 d) 47.4 wt. % water.

8. The zero-valent metal emulsion of claim 1, wherein said surfactant includes a water soluble surfactant and an oil soluble surfactant.

9. The zero-valent metal emulsion of claim 8, wherein said water soluble surfactants is selected from a group comprising oleyl cetyl alcohol, isotridecyl alcohol, and alkylaryl polyether alcohol.

10. The zero-valent metal emulsion of claim 8, wherein said oil soluble surfactant is selected from a group comprising sorbitan trioleate, bis-2-ethylhexyl sodium sulfosiuccinates, sodium salt of sulfonated naphthalene-formaldehyde condensate, and sodium dodecyl monolaureate.

11. The zero-valent metal emulsion of claim 1, wherein said oil is a food-grade vegetable oil.

12. The zero-valent metal emulsion of claim 11, wherein said food-grade vegetable oil is corn oil.

13. The zero-valent metal emulsion of claim 1, further comprising a stabilizing additive.

14. The zero-valent metal emulsion of claim 13, wherein said stabilizing additive is paraffin.

15. The zero-valent metal emulsion of claim 1, wherein said plurality of zero-valent metal particles is coated with 0.01–3.0 wt. % said catalytic metal.

16. The zero-valent metal emulsion of claim 1, wherein said catalytic metal is palladium.

17. The zero-valent metal emulsion of claim 1, wherein said surfactant is selected from the group consisting of sodium sulfoccinate, sorbitan sesquioleate, sorbitan monooleate, sorbitan trioleate, sodium dodecylbenzene sulfonate, sodium naphthalene sulfonate, sodium lauryl sulfate, sorbitan monostrearate, polyoxyethylene-sorbitan monostrearate, polyoxyethylene-sorbitan tristearate, polyoxyethylene-sorbitan monooleate and polyoxyethylene-sorbitan trioleate.

18. The zero-valent metal emulsion of claim 1, wherein said surfactant is a food-grade surfactant.

19. A zero-valent metal emulsion comprising,
 a) a plurality of zero-valent metal particles or a plurality of bimetallic particles, wherein said plurality of bimetallic particles is a plurality of zero-valent metal particles coated with a catalytic metal;
 b) a surfactant;
 c) an oil or d-limonene or both oil and d-limonene; and
 d) water including an acid or a base.

20. The zero-valent metal emulsion of claim 19, wherein said plurality of zero-valent metal particles is a plurality of zero-valent iron particles.

21. The zero-valent metal emulsion of claim 20, wherein said plurality of zero-valent iron particles is a plurality of nanoscale zero-valent iron particles or a plurality of microscale zero-valent iron particles.

22. The zero-valent metal emulsion of claim 21, wherein said plurality of nanoscale zero-valent iron particles are 100–300 nm in diameter.

23. The zero-valent metal emulsion of claim 22, wherein said plurality of microscale zero-valent iron particles are 1–3 microns in diameter.

24. The zero-valent metal emulsion of claim 20, comprising
 a) 6–20 wt. % zero-valent iron particles;
 b) 1.0–3.01 wt. % surfactant;
 c) 15–60 wt. % oil or d-limonene; and
 e) 15–60 wt. % water including an acid or a base.

25. The zero-valent metal emulsion of claim 24, comprising
 a) 8.5 wt. % zero-valent iron particles;
 b) 1.4 wt. % surfactant;
 c) 42.7 wt. % oil; and
 d) 47.4 wt. % water containing an acid or a base.

26. The zero-valent metal emulsion of claim 19, wherein said surfactant includes a water soluble surfactant and an oil soluble surfactant.

27. The zero-valent metal emulsion of claim 26, wherein said water soluble surfactant is selected from a group comprising oleyl cetyl alcohol, isotridecyl alcohol, and alkylaryl polyether alcohol.

28. The zero-valent metal emulsion of claim 26, wherein said oil soluble surfactant is selected from a group comprising sorbitan trioleate, bis-2-ethylhexyl sodium sulfosiuccinates, and sodium salt of sulfonated naphthalene-formaldehyde condensate, sodium dodecyl monolaureate.

29. The zero-valent metal emulsion of claim 19, wherein said oil is a food-grade vegetable oil.

30. The zero-valent metal emulsion of claim 29, wherein said food-grade vegetable oil is corn oil.

31. The zero-valent metal emulsion of claim 19, further comprising a stabilizing additive.

32. The zero-valent metal emulsion of claim 31, wherein said stabilizing additive is paraffin.

33. The zero-valent metal emulsion of claim 19, wherein said surfactant is selected from the group consisting of sodium sulfoccinate, sorbitan sesquioleate, sorbitan monooleate, sorbitan trioleate, sodium dodecylbenzene sulfonate, sodium naphthalene sulfonate, sodium lauryl sulfate, sorbitan monostrearate, polyoxyethylene-sorbitan monostrearate, polyoxyethylene-sorbitan tristearate, polyoxyethylene-sorbitan monooleate and polyoxyethylene-sorbitan trioleate.

34. The zero-valent metal emulsion of claim 19, wherein said surfactant is a food-grade surfactant.

35. The zero-valent metal emulsion of claim 19, wherein said acid is selected from the group comprising hydrochloric acid, sulfuric acid, nitric acid, acetic acid and lactic acid.

36. The zero-valent metal emulsion of claim 19, wherein said water has a pH between 4 and 5.

37. The zero-valent metal emulsion of claim 19, wherein said base is selected from the group comprising sodium hydroxide and organic amines.

38. The zero-valent metal emulsion of claim 19, wherein said water has a pH between 9 and 10.

* * * * *